Aug. 1, 1961 E. A. HILKER 2,994,738

TELEGRAPH SWITCHING SYSTEM

Filed March 5, 1959 5 Sheets-Sheet 1

INVENTOR.
Eugene A. Hilker

BY C. A. Gulbrandsen

Atty

Aug. 1, 1961 E. A. HILKER 2,994,738

TELEGRAPH SWITCHING SYSTEM

Filed March 5, 1959 5 Sheets-Sheet 2

INVENTOR.
Eugene A. Hilker
BY
C. A. Gulbrandsen
Atty.

INVENTOR.
Eugene A. Hilker
BY C. A. Gulbrandsen
Atty.

Aug. 1, 1961 E. A. HILKER 2,994,738

TELEGRAPH SWITCHING SYSTEM

Filed March 5, 1959 5 Sheets-Sheet 4

INVENTOR.
Eugene A. Hilker
BY
C. A. Gulbrandsen
Atty.

INVENTOR.
Eugene A. Hilker
BY
C. A. Gullbrandsen
Atty.

United States Patent Office 2,994,738

Patented Aug. 1, 1961

2,994,738

TELEGRAPH SWITCHING SYSTEM

Eugene A. Hilker, Addison, Ill., assignor to Automatic Electric Laboratories, Inc., a corporation of Delaware Filed Mar. 5, 1959, Ser. No. 797,530
6 Claims. (Cl. 178—2)

This invention relates in general to an arrangement for retransmitting a previously transmitted telegraph message, and more particularly relates to an arrangement in which a transmitted telegraph message recorded at the point of transmission in sequence with other telegraph messages, is retransmitted without mutilating the recording medium on which said messages are recorded and further relates to an arrangement wherein the retransmission is controlled from a location remote from the recording site.

The invention is designed to function with a type of telegraph apparatus described in application No. 625,004, filed by Stiles et al. on November 29, 1956, and disclosing a telegraph switching center at which incoming or originating telegraph messages are provided with certain procedural information including a routing indicator corresponding to a particular destination. As described in the aforementioned application, a telegraph message is processed in accordance with the procedural information therein and stored in a cross office unit. The cross office unit, which is common to both incoming and outgoing lines is associated with the outgoing channel unit having access over an outgoing line to the destination corresponding to the routing indicator. Telegraph message signals corresponding to the stored message are transmitted from the cross office unit to the channel unit and repeated to the outgoing line by a relay at the outgoing channel unit, while a simultaneous record of the outgoing signals is constructed on a tape by means of a reperforator at the channel unit. Transmission takes place either over a physical connection to the destination or to a radio station, from which the message is in turn transmitted over a radio circuit to the destination.

The record is provided by the reperforator at the outgoing channel unit for the purpose of determining fault conditions existing in the message and for administrative and other reasons having to do with customer preference. In addition, because radio circuits occasionally fail or because messages must be rerun, it is often necessary to retransmit a message stored at an outgoing channel unit. In these cases it is necessary to unwind the tape on the reperforator take up reel, and select the desired message or messages by tearing the same from the tape. The torn tape containing the selected message or messages is then physically carried to a patch table, where a new pilot heading including a new message number is provided so that when each message is subsequently transmitted, it appears in its proper message order.

In the present invention a tape reader is provided at the channel unit. To retransmit a message the tape is unwound from the reperforator take up reel and the slack tape is inserted in a tape reader at the point where the first message to be retransmitted is located. Then under control of the radio operator at a distant point the message is read or interpreted by the tape reader and is retransmitted via a markable transmitter individual to the channel unit and the aforementioned relay. If a rerun is required, the tape reader is associated with one of a group of common markable transmitters and reperforators at a patch table and the message transmitted thereto under control of a switching center attendant for further processing. In either event the message is transmitted without mutilating or tearing the record or message tape located at the outgoing channel unit through which it was originally transmitted.

It is therefore an object of the present invention to provide apparatus whereby one or more telegraph messages, which have been recorded at an outgoing channel unit, are retransmitted without mutilating the message record at the channel unit.

It is a further object of the present invention to provide for the reception and recording of a message at said outgoing channel unit, while a message is being retransmitted.

It is a further object of the present invention to provide apparatus whereby an operator at a distant point may control the retransmission of a telegraph message recorded at an outgoing channel unit.

Another object of the present invention is to provide an arrangement whereby a message recorded at an outgoing channel unit may be transmitted from the record either over a radio circuit to a patch table without mutilating or transferring the record.

It is another object of this invention to enable a message recorded at an outgoing channel unit to be transferred without mutilating the record and without interfering with normal transmission through the channel unit.

A feature of this invention is the provision of a tape reader together with control circuits therefor at an outgoing channel unit to permit the reading and retransmission of a message already transmitted and recorded at the channel unit.

Another feature of this invention is the arrangement whereby the tape reader at the channel unit may be utilized for reading a message recorded at a channel unit for transmitting the message via a markable transmitter common to a plurality of channel units to a reperforator at a patch table.

A further feature of this invention is the arrangement whereby the tape reader and a transmitter at the outgoing channel unit may be controlled from a distant point to permit transmission of message signals from the outgoing channel unit.

Other objects and features of this invention will become apparent on further study and appraisal of the following specification, claims and drawings.

Figure 1:
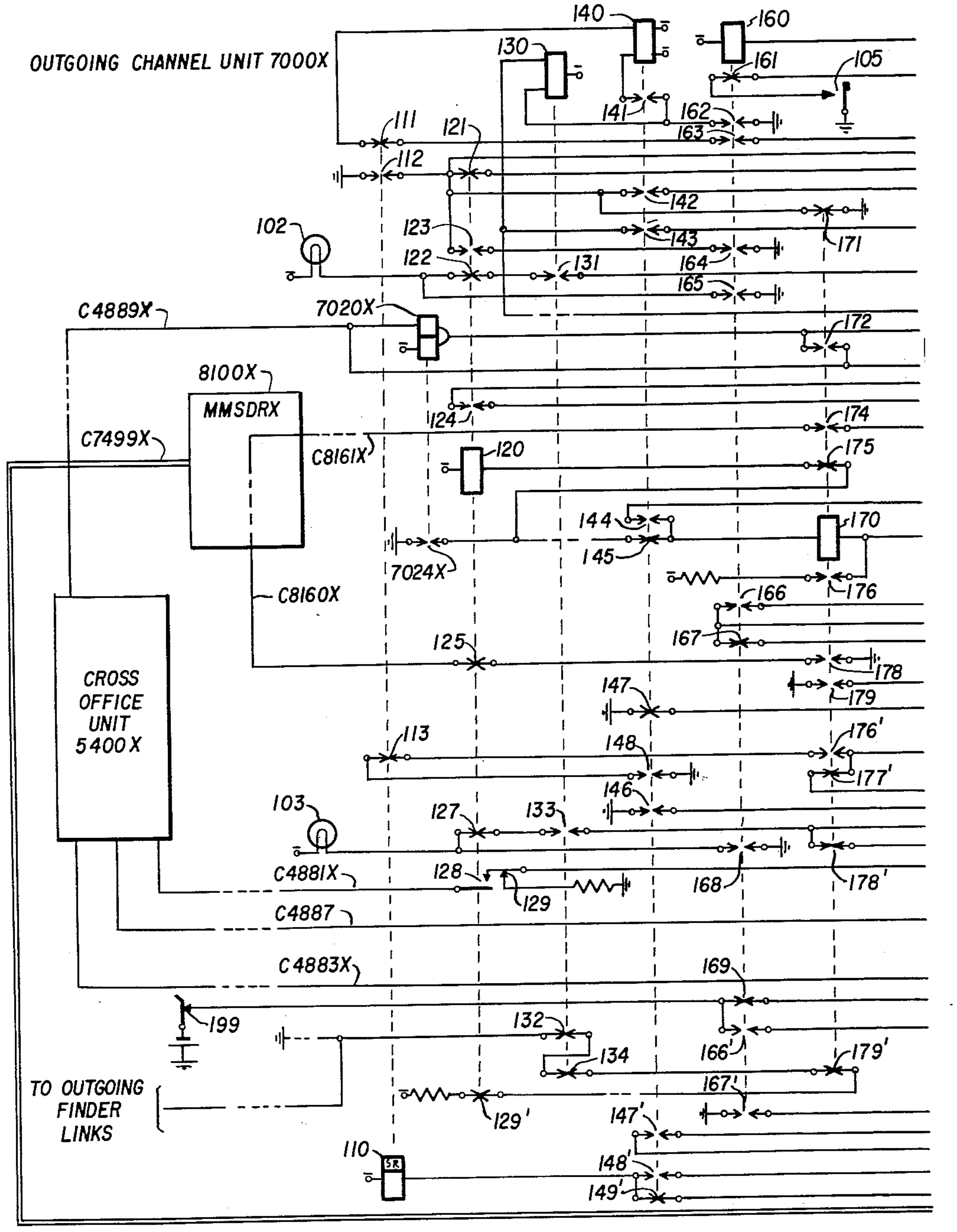
FIGS. 1, 2 and 3 show portions of an outgoing channel unit of the same general type as described in the aforementioned application together with the apparatus functioning therewith for accomplishing the purposes of the present invention.
Figure 2:
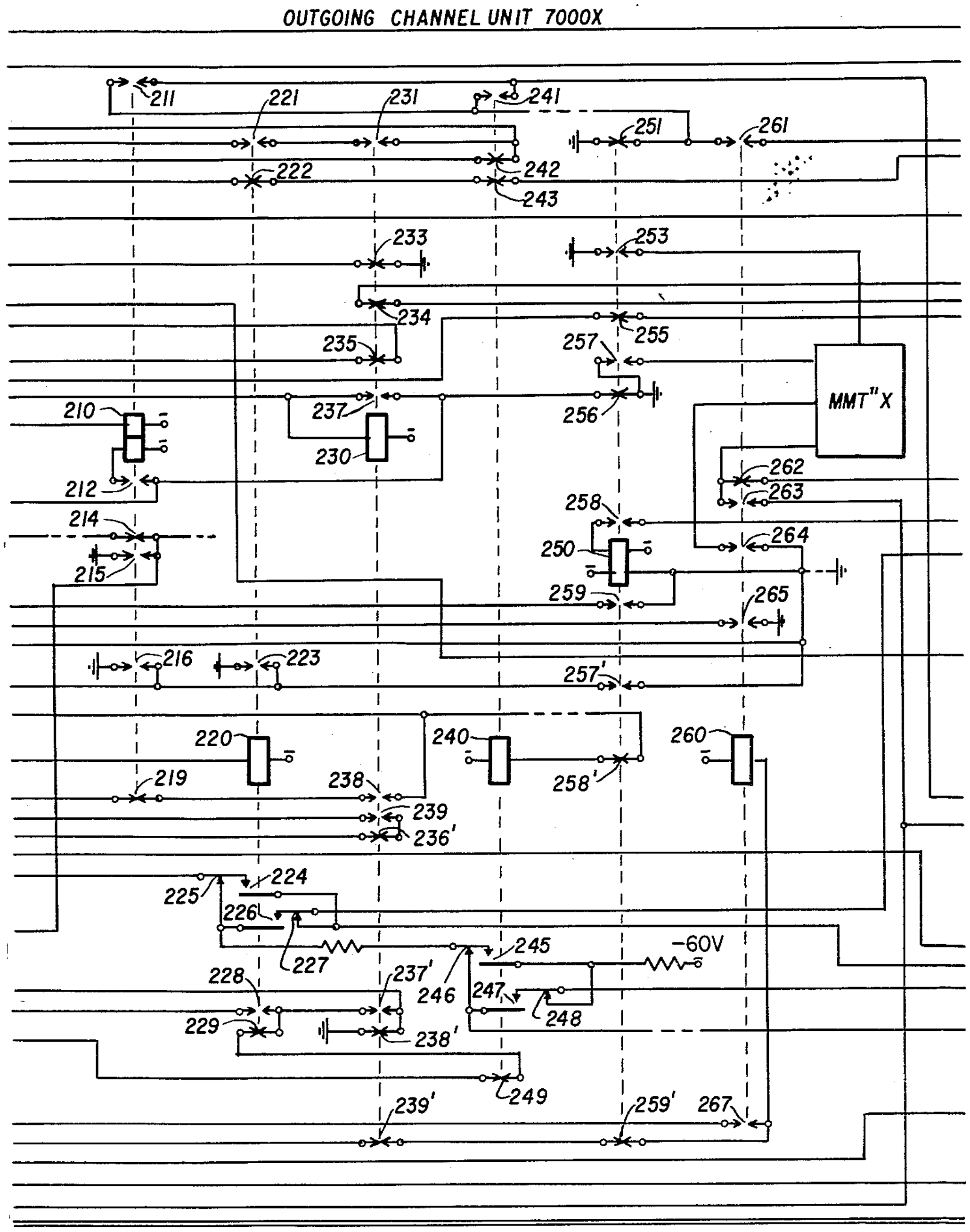
Figure 3:
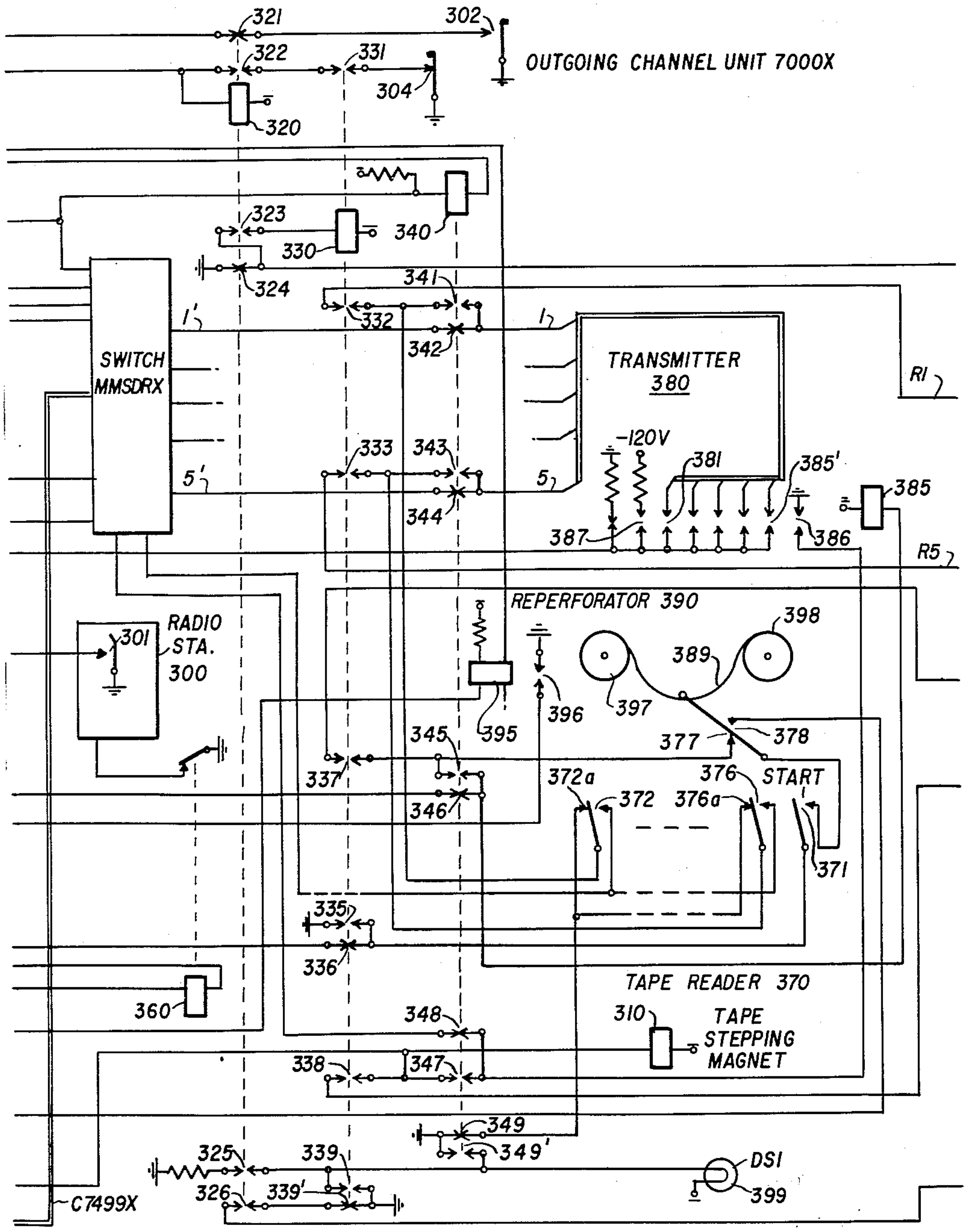
Figure 4:
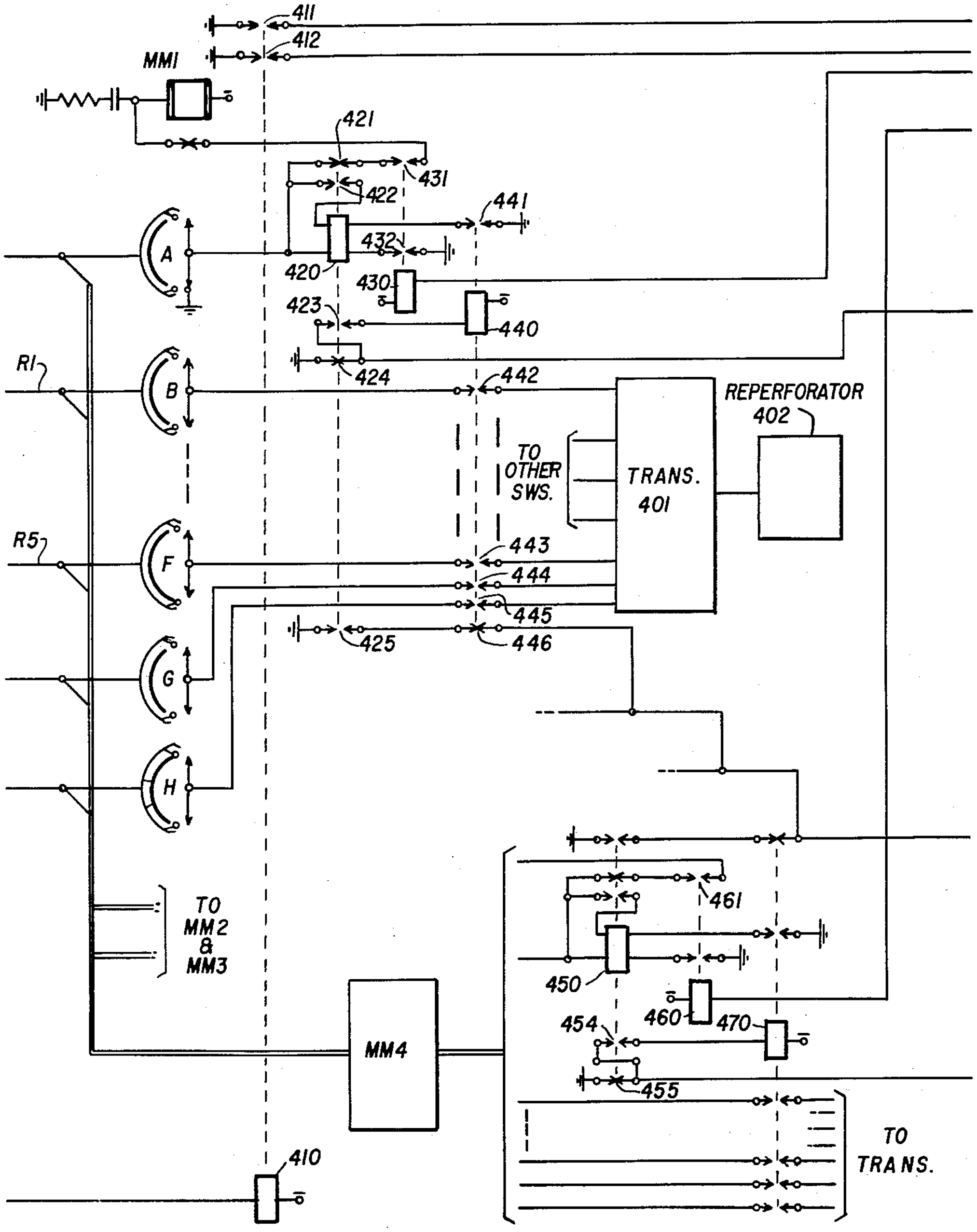
FIGS. 4 and 5 show various apparatus used in selecting a common transmitter such as 401 and its associated reperforator 402 at a patch table whereby a message stored at an outgoing channel unit is transmitted to a patch table in the switching center.
Figure 5:
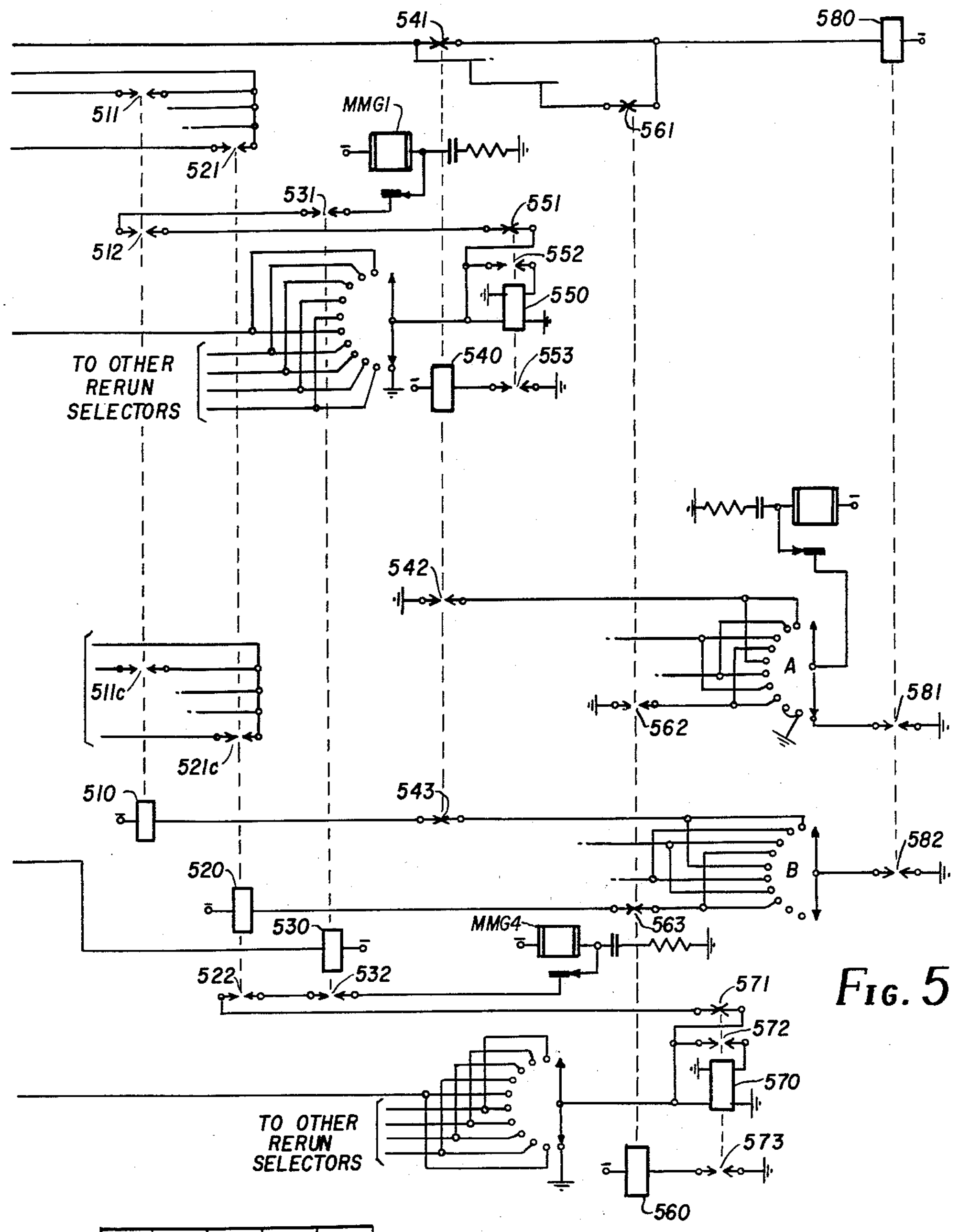
Figure 6:
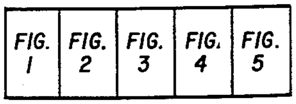
FIG. 6 shows a manner in which FIGS. 1, 2, 3, 4 and 5 should be arranged for best comprehension of the invention.

Wherever deemed feasible, the apparatus described in the present invention, which has been shown in the aforementioned application, is given the same reference character used in the aforementioned application followed by the letter X for the purpose of enabling easy reference to the same apparatus in the aforementioned application and understanding of the present invention. Dashed lines in the drawings indicate the presence of contacts, relays or other apparatus whose function is largely incidental to the present invention.

A cross office unit indicated by the box marked 5400X is associated under control of the switching center apparatus and message information with an outgoing channel unit such as 7000X corresponding to the message destination via an outgoing selector switch (not shown). The message is stored in the cross office unit and is transmitted through the outgoing channel unit 7000X having access to the message destination. It will be understood that the cross office unit 5400X is one of a plurality of cross office units which are common to a plurality of outgoing channel units such as 7000X and that several cross office units may be associated at any time with any one channel unit, as described in the aforementioned application.

In each channel unit such as 7000X is a switch MMSDRX, having bank contacts marked in any well-known manner, and a markable transmitter 380, whereby certain procedural information such as a start-of-message indicator, hereinafter abbreviated SOM, and an end-of-message indicator, hereinafter abbreviated EOM, are respectively transmitted at a predetermined time in the message via transmitter 380 and polar relay 360 to the desired destination. In the present instance it will be assumed that transmission to the desired destination is by means of a radio circuit including a radio transmitter located at radio station 300, which is at some point remote from the switching center and channel unit 7000X.

A reperforator 390 is also provided at each channel unit for the purpose of recording message signals by reperforating a tape 389, which is unwound from one reel 397 and wound upon another reel 398 in any well-known manner. Each channel unit also has associated therewith a message number assigner indicated by the box marked 8100X, whereby each message transmitted over the channel is assigned a successive number. Each number is transmitted under control of assigner 8100X and switch MMSDRX, as explained in the aforementioned application. In addition each channel unit is provided with character counting switches such as MMU"X and MMT"X indicated by the box marked MMT"X, which are used for counting a number of characters as described in the aforementioned application.

One or more cross office units may be associated with an outgoing channel unit through which each must transmit its message. An outgoing finder link (not shown) is signalled over lead C6401X in response to the association and it controls the selection of the cross office unit which is permitted to seize the channel unit 7000X in accordance with which one has the highest precedence message in a manner similar to that described in the aforementioned application. The cross office unit such as 5400X, which is permitted to seize the channel unit 7000X extends ground over lead C4889X to operate relay 7020X, which in turn extends ground over contacts 7024X and 175 to operate relay 120. Relay 120 enables ground from relay contacts not shown to be extended over contacts 238' and lead C4883X to signal the cross office unit accordingly.

The cross office unit 5400X now transmits its identity number to the reperforator 390 at the channel unit, which records the same. After transmission of the identity number, the channel unit is signalled accordingly and the SOM is transmitted via the radio station to the destination, under the control of switch MMSDRX and polar relay 360. The SOM is simultaneously recorded on the tape 389 by the reperforator 390. Following the SOM, the number assigned to the particular message is transmitted under control of switch assigner 8100X, switch MMSDRX and polar relay 360 and is also recorded by reperforator 390.

After transmission of the message number, the cross office unit is signalled as explained in the aforementioned application and it initiates transmission of the body of the message. The body of the message is transmitted over the signal lead 4881X from the cross office unit and repeated by the polar relay 360 to the message destination. It is also recorded by the reperforator 390. Following transmission of the body of the message the cross office unit reads the message EOM and signals the outgoing channel unit accordingly. The outgoing channel unit then transmits an EOM under control of switch MMSDRX and polar relay 360, and the assigner switch 8100X is advanced to provide a succeeding message number to the succeeding message transmitted through the outgoing channel unit. The transmitted EOM is also recorded by reperforator 390.

In the event the radio circuit should fail, an operator at the radio station closes key contacts 301 to extend an operating ground to relay 130. She also informs a switching center attendant via telephone of the condition and as to which message or messages have not been transmitted. This may occur at any time during message transmission or when the channel unit is idle.

The switching center attendant unwinds the tape from the reperforator take up reel 398 and inserts the slack tape between the reperforator reels in the tape reader 370. The beginning of the first message, which was not transmitted is associated with the tape reader sensing pins. She then closes the start contacts 371 on the tape reader 370 and operates key contacts 302.

Contacts 302 on closing operate relay 160, which operates relay 140 in the event the channel unit is idle or if it is busy transmitting the message portion following the message number. Relay 140 prepares an operating circuit to relay 340, which is not effective until key contacts 301 are restored. If transmission is occurring from a cross office unit to the channel unit, it is temporarily interrupted and then continues so that the reperforator 390 records the message, however the polar relay 360 is disconnected from the signal circuit to prevent repetition of message signals to the radio station.

After the radio circuit is in condition to resume transmission, the operator opens key contacts 301 to operate relay 340. Relay 340 initiates operation of the markable transmitter 380 over the tape reader start contacts 371. The transmitter 380 in turn steps the tape reader 370. With the tape reader 370 operating, it reads or interprets the message and transmits signals corresponding to the successive tape perforations to the markable transmitter 380, which in turn transmits the same sequentially to polar relay 360. Polar relay 360 in turn transmits the signals over the line to the radio station and from there the signals are transmitted to the desired destination.

If transmission from a cross office unit is taking place, it continues over the signal circuit to the reperforator 390 so that the complete message is transmitted thereto and recorded on the tape. The tape in turn is read by the tape reader and the signals which have been transmitted from the cross office unit are transmitted in sequence to the desired destination. Transmission of message signals continues until the slack tape between the reperforator reels is taken up, after which the counting switches MMU"X and MMT"X control the reperforator 390 to feed out sufficient blank tape to ensure that the last message EOM is completely transmitted.

In the event of a re-run necessitating a new message heading, as the message is to be transmitted in a sequence, which does not correspond to its recorded message number, the tape 389 on the reperforator take-up reel 398 is unwound and the slack tape inserted in the tape reader 370. A hole is punched in the tape at the point, after a last message to be transmitted and in alignment with a pair of normally closed contacts 304. In this case a switching center attendant operates key 105 to operate the relay 320. Relay 320 in turn initiates operation of relay 410. Relay 410 is individual to four re-run selector switches such as MM1 and MM4, which have access to outgoing channel unit 7000X and twenty-four other channels in the same group.

Four markable transmitters such as 401 each having an individual reperforator such as 402 at a patch table are provided to service all outgoing channel units and each markable transmitter is individual to one of the four switches such as MM1 in each group of similar switches having access to a different group of twenty-five channel units. Thus other switches such as MM1 having access to other groups of twenty-five channel units each have access to a particular one of the four markable transmitters such as 401. In this arrangement, if four outgoing channel units in one group need the service of the common markable transmitter each of the four switches such as MM1 to MM4 having access to the group of channel units, extend transmitting circuits to respective transmitters such as 401.

To assign the four markable transmitters, an assigner switch MMA is used to select a switch such as MMG1 individual to an idle transmitter such as 401 and it in turn searches for one of the switches such as MM1 having access to its transmitter and the desired group of channel units.

Thus, relay 410 initiates operation switch MMA which in turn controls the selection of an idle switch such as MMG1 or MMG4 corresponding to one of the four markable transmitters, which are available for use at the patch table. Switch MMG1 in turn on being selected searches for the re-run selector switch such as MM1, and on finding the same permits the switch MM1 to search for and find the desired outgoing channel unit. The tape reader sensing leads are then extended through respective levels of switch MM1 to the selected markable transmitter 401 at the patch table.

The operator is signalled and releases key 105. She also operates the reader start contacts 371 to begin transmission of the desired message or messages from the outgoing channel unit to the markable transmitter 401 and reperforator 402 at the patch table. At the end of the message tape, contacts 304 open to restore relay 320, which terminates further transmission.

*Normal channel unit operation*

In detail when the cross office unit 5400X is permitted to seize the channel unit, it operates relay 7020X via ground applied to lead C4889X. Relay 7020X in turn operates relay 120 over contacts 7024X and 175 and it in turn enables ground to be extended from relay contacts not shown past contacts 238′ to lead C4883X. Relay 120 removes resistance ground at contacts 129 from the winding of reperforator magnet 395 and extends resistance ground thereto from the cross office unit over contacts 128 and lead C4881X as explained in the aforementioned application. At contacts 121 it opens a possible circuit to relay 140 and at contacts 125 a possible circuit to assigner 8100X. At contacts 124 a circuit is prepared to relay 230. At contacts 129′ it opens a circuit extending over contacts 179′, 134 and 132 and over which a cross office unit may normally request seizure of the channel unit.

The cross office unit 5400X responding to ground on lead C4883X transmits its identifying number via lead C4881X, contacts 128, 225 and 246 to the monitor reperforator 390 at the channel unit. The reperforator 390 closes its numbering pulse contacts 396 during each cycle to extend ground over contacts 149′ to operate slow-to-release relay 110. It opens a possible circuit to relay 140 at contacts 111. When transmission of the identifying number is completed, a relay (not shown), in the channel unit, is operated over lead C4887X to complete a circuit from ground at contacts 147, over contacts 258′ for energizing relay 240, while the circuit for energizing the cross office transmitter over lead C4883X is opened as explained in the aforementioned application.

Relay 240 opens the signal circuit from the cross office unit to the reperforator at contacts 246 and extends resistance battery back over the signal circuit at contacts 245. At contacts 248 it disconnects resistance battery from polar relay 360 and at contacts 247 connects the polar relay 360 in series with reperforator magnet 395. Both are now connected in series with the signal lead of the markable transmitter 380 over contacts 227. At contacts 249 relay 240 opens one point in a presently unused cross office unit transmitter clutch magnet circuit. At contacts 243 relay 240 opens a possible circuit for relay 340. It also closes contacts 241 to extend ground from contacts 251 over contacts 346 for energizing the clutch magnet 385 of the markable transmitter 380.

The SOM is now transmitted from respective markings on switch MMSDRX over conductors 1′—5′, contacts 342—344 respectively, the sequentially closed contacts 381—385 of the markable transmitter 380, contacts 27, the polar relay 360, through contacts 247 and the reperforator magnet 395. Contacts 387 on the markable transmitter 380 close to initially forward —120 volt resistance battery which appears as a start signal to the succeeding equipment all as explained in the aforementioned application. The message number, which follows the SOM, is transmitted over a similar circuit except that the markings corresponding to the message number are transmitted over conductors in cable C7499X, through switch MMSDRX dependent on the position of message number assigner 8100X. During each cycle of the transmitter 380, its numbering pulse contacts 386 close to extend ground over contacts 348 to step switch MMSDRX to successive positions. When switch MMSDRX is stepped to a predetermined position, it operates a relay (not shown) for opening the circuit to the clutch magnet 385 in a manner similar to that explained in the aforementioned application. It will be noted that the operation is similar to that described in the aforementioned application, with the major exception that the SOM and message number are not transmitted, until after the identity number is received from the cross office unit, whereas in the aforementioned application transmission of the identity number to the reperforator takes place while the SOM and message number are transmitted over the line via the polar relay.

The message signals are transmitted from polar relay 360 in the outgoing channel unit 7000X to the associated radio transmitter at the distant radio station 300 and from there to the desired destination, while reperforator magnet 395 perforates a tape in accordance with the signals. The message comprises in addition to the aforementioned SOM and message number, the body of the message and an EOM. After the message number is transmitted, relay 230 is operated under control of switch MMSDRX, over contacts 255 and 124.

At contacts 238 relay 230 extends ground from contacts 147 past contacts 219 and 177′ to operate relay 220. At contacts 231 it prepares a circuit to relay 140. At contacts 235 it opens the shunt for one winding of relay 7020X from lead C4889X to permit a cross office unit having a higher precedence message to cancel the message being transmitted as explained in the aforementioned application. At contacts 237 relay 230 locks operated to contacts 256. At contacts 238′ it opens a point in the already open circuit to the cross office transmitter clutch magnet, and at contacts 237′ it prepares a circuit therefor. At contacts 239 relay 230 prepares a circuit to the reader start contacts 371, and at contacts 239′ opens a possible circuit for relay 260.

Relay 220 closes contacts 228 to extend ground from key contacts 199, past contacts 169 and 237′ to lead C4883X. The cross office unit now initiates transmission of the body of the message. At contacts 224 relay 220 connects the cross office signal lead C4881X to the polar relay 360 and reperforator magnet 395, while at contacts 227 it disconnects the polar relay 360 and magnet 395 from the transmitter signal lead. At contacts 226 relay 220 connects resistance battery to the signal lead of transmitter 380. At contacts 223 it prepares a holding circuit for relay 260, and at contacts 221 prepares a circuit for relay 140. At contacts 222 it opens a point in an incomplete circuit to relay 340. The body of the message is now transmitted from the cross office unit to the polar relay 360 and recorded on tape 389 by reperforator 390.

In addition to the SOM and message number, the EOM is provided in accordance with markings on switch MMSDRX in a manner similar to the SOM, after the body of the message is transmitted from the cross office unit over lead C4881X, contacts 224 to polar relay 360, and past contacts 247 to the reperforator 390 as explained in the aforementioned application. The cross office unit on detecting the EOM extends battery over lead C4887X, contacts 214, through relay 170 and contacts 145 to ground at contacts 7024X. Relay 170 operates and opens the circuit to relay 120 at contacts 175. At contacts 178 and 174 relay 170 prepares a circuit to relay 210. At contacts 176 it completes its own holding circuit, and at contacts 172 it shunts one winding of relay 7020X to prevent message cancellation. At contacts 179' it prevents signalling an outgoing finder link and at contacts 178' opens a possible ground for contacts 371. At contacts 171 it opens a possible circuit for relay 340. At contacts 177' it restores relay 220.

Relay 120 restores to close contacts 129' which prepares a circuit to permit the outgoing channel unit to signal an outgoing finder link. At contacts 125 relay 120 extends ground from contacts 178 over lead C8160X to the message assigner 8100X, which in turn extends the ground over lead C8161X and contacts 174 to relay 210. Relay 210 extends ground over lead C4887X to release the cross office unit 5400X and at contacts 211 extends ground to the markable transmitter clutch magnet 385 to initiate operation of the transmitter 380. At contacts 212 it energizes its lower winding over contacts 256. The cross office unit 5400X on releasing opens the circuit to relay 7020X, which opens the circuit to relay 170 at contacts 7024X. Relay 170 therefore restores to release its contacts. Relay 210 is held operated however, and it holds open the circuit to relay 220 at contacts 219. With relay 170 restored to open contacts 178 the message assigner 8100X is advanced so that a succeeding message number is assigned the next message.

With relay 220 restored, the polar relay 360 and reperforator magnet 395 are connected in series with the signal lead of transmitter 380, as explained. Pulses from the transmitter contacts 386 now step switch MMSDRX over contacts 348, which in turn transmits its EOM markings through the transmitter to polar relay 360 and reperforator 390 in a manner similar to the transmission of the SOM. When switch MMSDRX is stepped to a predetermined position it extends the transmitter numbering contacts 386 to the character counting switches MMU"X and MMT"X over contacts 262. This permits a predetermined number of the same characters to be transmitted, while switch MMSDRX remains in the same position, after which switches MMU"X and MMT"X control the operation of a relay (not shown), which in turn energizes the lower winding of relay 250 in a manner similar to that explained in the aforementioned application. At the end of character transmission the reperforator operation is terminated and contacts 396 remain open to allow relay 110 to restore.

Relay 250 completes homing circuits for switches MMU"X and MMT"X at contacts 253 and 257 respectively, which in turn open holding circuits for relay 250, when stepped home. At contacts 257' relay 250 completes a holding circuit for itself to contacts 216 and at contacts 256 and 258' restores relays 210, 230 and 240 respectively. At contacts 234 relay 230 enables switch MMSDRX to step to its original position and at contacts 235 permits operation of relay 7020X by a cross office unit waiting to seize the channel unit. With switch MMSDRX stepping to its initial position it controls the restoration of the original circuit for relay 250 and a circuit for the upper winding of relay 250 extending over contacts 258. With relay 210 restored to open contacts 216, relay 250 can restore as soon as the switches are stepped to the proper position.

*Radio failure*

Failure of the radio transmission circuit may occur at any time during message transmission or during a period when the channel unit is idle and several messages may have been processed through the outgoing channel unit, before the radio operator can inform the switching center. A radio operator operates switch 301 associated with the particular channel unit in case the radio circuit associated with that channel fails. Ground is extended by switch 301 over contacts (not shown) to energize relay 130. If an outgoing finder link is in the process of selecting a cross office unit to seize the channel unit, the just mentioned contacts are held open until the cross office unit is selected, and then closed to permit operation of relay 130.

Relay 130, on operating, closes contacts 131 and 133. With both relays 120 and 230 unoperated indicating that the channel unit is idle, ground is extended from contacts 233 and 236' respectively, past contacts 131 and 133 respectively and 122 and 127 respectively, to energize lamps 102 and 103 respectively. This informs a switching center attendant of the situation. At contacts 132 and 134 relay 130 prevents the normal signalling of an outgoing finder link over lead C6401X and the seizure of the channel unit by a cross office unit. If the channel unit is already seized, relay 120 is operated and contacts 122 and 127 remain open until the EOM is detected at the transmitting cross office unit, while relay 230 holds, contacts 233 and 236' are open to prevent lighting of lamps 102 and 103, until the channel unit has completed its function. Therefore, once the channel unit is seized, the lamps remain unlighted. In either event the radio stations operator calls the switching center attendant and informs her which message or messages have not been and/or are not being transmitted and requests retransmission of the same.

On receiving a communication from the radio operator, the switching center attendant selects the message or messages requested for retransmission from the reel 398 of the monitor reperforator 390 associated with the outgoing channel unit 7000X and draws back enough tape 389 to permit insertion of the tape in the associated monitor tape reader 370, which is positioned in proximity to the reperforator and between the tape reels in any well known manner. The tape output of the reperforator will now be fed to the tape reader, which in turn will feed the tape to the reperforator take-up reel in any well known manner. The beginning of the first untransmitted message is associated with the tape reader sensing pins so that the first untransmitted message is processed, as soon as possible after the tape reader is operated. The switching center attendant then closes the monitor tape reader start contacts 371, and operates the pullback key 302. The latter extends an operating ground to relay 160.

Relay 160 energizes the lower winding of relay 130 at contacts 162 and at contacts 161 opens a possible circuit for relay 320. At contacts 163 and 164 it prepares a circuit for the upper winding of relay 140. At contacts 165 and 168 respectively it completes respective circuits for lamps 102 and 103. At contacts 166 it prepares a locking circuit for relay 250, and at contacts 167 it opens a possible circuit to relay 250. At contacts 169 it opens a point in the cross office transmitter clutch magnet circuit extending from key contacts 199, over contacts 169, 228 and 237' to lead C4883X, if the body of a message is being transmitted from a cross office unit. At contacts 166' relay 160 prepares another circuit for the cross office transmitter clutch magnet. At contacts 167' relay 160 prepares a circuit to the lower winding of relay 260.

If a cross office unit is associated with the channel unit and transmission therefrom is taking place, opening the cross office transmitter clutch magnet circuit at contacts 169 terminates operation of the transmitter and the transmission of message signals therefrom cease, after the transmitter has completed its cycle. If the cross office identity number or SOM or message number are being transmitted, the operation of relay 160 does not interfere therewith and transmission thereof continues. Relays 230 and 220 are then operated, as explained. With relays 220 and 230 operated, after the message number is transmitted, the cross office clutch magnet circuit extending from contacts 199 is prepared, but contacts 169 being open prevents its completion. Transmission of the message body therefore does not begin. If the EOM is being transmitted, relays 170 and 210 have been operated and relay 220 is restored, however the cross office unit has been released so that no circuit is completed over lead C4883X. The EOM is transmitted and recorded as described. Reperforator 390, which is responding to message signals and retaining relay 110 operated, halts operation to terminate the numbering pulses normally extended from contacts 396 to maintain slow-to-release relay 110 operated, when the signals incoming thereto terminate. Relay 110 restores after a time period long enough to ensure that a character in the process of transmission to the reperforator 390 is fully received. At contacts 111 it completes a circuit to the upper winding of relay 140, and at contacts 113 prepares a circuit for relay 220.

If no transmission is taking place at the time relay 160 operates, relays 110 and 240 are restored, and the ground at contacts 171 is extended past contacts 121, 242, 163 and past contacts 111 to energize the upper winding of relay 140. If transmission from the cross office unit, were taking place, relay 110 is restored as explained and relays 120, 220, 230 and 240 are operated. Ground is then extended from contacts 164 and 232, past contacts 123, 221, 231, 163 and 111 to operate relay 140. It will be noted that relay 140 cannot operate in the event the channel unit is seized, until relays 220 and 230 are operated. In the event relay 170 is operated contacts 171 are open and relays 120 and 220 are restored, while the EOM is transmitted. On this event ground is not extended to relay 140, until relays 170 and 110 are restored to close contacts 171 and 111.

Relay 140, on operating, energizes its lower winding over contacts 141 and 162. At contacts 144 relay 140 prepares a circuit for relay 170. If message transmission were taking place from the cross office unit, relays 220 and 240 are operated. At contacts 147 relay 140 opens the circuit to relays 220 and 240, which restore. At contacts 142 relay 140 therefore extends ground from contacts 171 and/or from contacts 164, past contacts 123 and through contacts 222 and 243 to battery through relay 340, however, relay 340 remains shunted by ground extended to its left side from key contacts 301 at the radio station and contacts 143. At contacts 148 relay 140 prepares a circuit for relay 220. Relay 220 on restoring opens the circuit to the upper winding of relay 140, if completed over contacts 221, however, it remains operated over the circuit to its lower winding. At contacts 146 relay 140 extends ground through contacts 178′ to the monitor tape reader start switch contacts 371, and at contacts 147′ prepares a circuit for relay 260. At contacts 149′ it opens a possible circuit for relay 110 from the reperforator numbering contacts 396, and at contacts 148′ prepares a circuit therefor from the markable transmitter numbering pulse contacts 386. With relays 220 and 240 restored and relay 230 operated, the cross office clutch magnet circuit is recompleted over contacts 199, 166′, 249, 229 and 137′ and lead C4883X. Transmission is therefore resumed to reperforator 390 only over the circuit used for transmitting the cross office identity number and the remainder of the message including the EOM is recorded in a manner similar to that described, while the cross office unit is restored responsive to the operation of relay 210. Relay 110 is not reoperated however, as contacts 148′ are open.

At such time as the radio circuit is again completed and the transmitter at the radio station is ready to transmit, the radio operator releases the key 301. This removes the shunting ground from relay 340, which operates over a circuit previously restored. At contacts 342—344, respectively, relay 340 disconnects switch MMSDRX marking leads 1′—5′ from the transmitter 380 and connects the tape reader marking leads 1—5 to the transmitter 380 at contacts 341—343 respectively. It closes contacts 345 to extend ground from contacts 146′, 178′, 336 and switch contacts 371, through the tape reader slack tape switch contacts 377 and contacts 345 to energize the monitor markable transmitter clutch magnet 385. The monitor transmitter 380 now operates and its numbering pulse contacts 386 close once during each cycle of operation. On the first cycle, contacts 386 close to extend ground over contacts 347 to energize the stepping magnet 310 of the monitor tape reader 370. The ground pulse is also extended from contacts 347 through contacts 148′ to energize slow-to-release relay 110. As contacts 348 are open, the ground pulse is not extended to switch MMSDRX.

Relay 110 opens the circuit for the upper winding of relay 140 at contacts 111. However, relay 140 remains operated over its lower winding. At contacts 112 relay 110 extends an additional operating ground for relay 340 over contacts 142, 222 and 243. At contacts 113 relay 110 opens a possible circuit for relay 220.

When contacts 386 on the markable transmitter open the circuit to relay 110 and the tape reader stepping magnet 310 is opened. Relay 110 is slow-to-release and remains operated, until it receives another pulse from numbering contacts 386. With stepping magnet 310 deenergized, the tape is advanced and the tape reader sensing contacts 372—376 and 372*a*—376*a* are controlled in accordance with the tape perforations they encounter.

During each succeeding cycle of the transmitter 380, ground is extended to energize relay 110 and magnet 310. The transmitter contacts 381—385 are sequentially operated to extend either resistance —120 v. battery through contacts 372—376 or resistance ground from contacts 372*a*—376*a* depending on the tape perforations encountered by the tape reader, over leads 1—5 respectively and past respective contacts 341—343.

The contacts 381—385 of the markable transmitter 380 close in sequence during the cycle to extend the resistance ground or resistance —120 v. battery signals corresponding to the tape perforations from leads 1—5, over contacts 227 to —60 v. battery through polar signal relay 360 and contacts 248. Polar relay 360 is therefore controlled in accordance with the message characters to transmit the message over the line to the radio transmitter and from there message signals are extended to the appropriate destination.

If a cross office unit were transmitting to the channel unit, the aforementioned restoration of relay 220 opens the cross office unit transmitter clutch magnet circuit at contacts 228 to terminate transmission from the cross office unit. With relays 220 and 240 restored and relay 160 operated the cross office transmitter clutch magnet circuit is again completed over key contacts 199, contacts 166′, 249, 229 and 237′ and lead C4883X. With the cross office transmitter clutch magnet energized, signals are extended over lead C4881X, past contacts 128, 225 and 246 to the monitor reperforator magnet 395 to record the rest of the message stored at the cross office unit.

In the event a message was being transmitted from the cross office unit to reperforator 395 at the time relay 340 is operated, transmission thereto continues, while the recorded portions of the message are independently transmitted under control of tape reader 390, transmitter 380 and polar relay 360. When the EOM is sensed at the cross office unit, resistance battery is extended to lead C4887X as explained in the aforementioned application. This operates relay 170 over contacts 214, 144 and 256. Relay 170 operates and now locks operated over contacts 176, 144 and 256. It opens the circuit to the clutch magnet 385 of transmitter 380 at contacts 178′. The transmitter numbering pulse contacts 386 open to in turn restore the tape reader stepping magnet 310 and open the circuit to relay 110. With no further pulses derived from the transmitter 380 the tape reader steps no further and relay 110 restores after a period of time. At contacts 171 relay 170 removes one operating ground from relay 340. At contacts 175 relay 170 restores relay 120, which closes contacts 125. At contacts 123 relay 120 disconnects ground at contacts 164 from relay 340, and at contacts 122 opens the cross office unit signal circuit. Relay 110 holds contacts 112 closed for a period determined by its release time to ensure that relay 340 remains operated long enough to ensure that a character being transmitted from the tape reader 370 is fully transmitted. At contacts 129 relay 120 places resistance ground on reperforator magnet 395. Relay 170 also extends ground at contacts 178 to operate relay 210, as soon as relay 120 restores, via lead C8160X, the message number assigner switch 8100X self-interrupting contacts (not shown) and over lead 8161X and contacts 174.

At contacts 211 relay 210 prepares a circuit to the markable transmitter clutch magnet 385 from ground at contacts 251. At contacts 212 relay 210 energizes its lower winding over contacts 256, and at contacts 215 relay 210 connects ground to lead C4887X, which signals the cross office unit to release. The cross office unit releasing from channel unit opens lead C4889X, however now relay 170 does not restore as it is held operated over contacts 176, 144 and 256.

Relay 110 restores after a period long enough to ensure that the character being transmitted by transmitter 380 is fully transmitted. It then opens the last circuit to relay 340 at contacts 112. Relay 340 on restoring opens a point in the circuit to the tape reader stepping magnet 310 and to relay 110 at contacts 347. It also disconnects the tape reader signal leads 1—5 from transmitter 380, and at contacts 341—343 respectively connects switch MMSDRX signal leads 1′—5′ at contacts 342—344 respectively to the markable transmitter. At contacts 348 relay 340 transfers the transmitter numbering pulse contacts 386 to switch MMSDRX. At contacts 346 a circuit is completed to the transmitter clutch magnet 385 from ground at contacts 251 and 211 and the transmitter initiates operation.

With relays 140 and 170 operated and relay 110 restored, ground is extended from contacts 148, past contacts 113, and 176′ to operate relay 220.

Operated relay 220 opens the cross office transmitter clutch magnet lead C4883X at contacts 229, and extends resistance ground from contacts 129 over contacts 224 to the polar relay 360 and —60 v. resistance battery through contacts 248. It connects the markable transmitter signal lead to the monitor reperforator over contacts 226 and 246 and disconnects the polar relay 360 therefrom at contacts 227.

With the transmitter 380 in operation and its signal lead connected to the reperforator it now transmits the EOM to the monitor reperforator in accordance with markings on switch MMSDRX, while advancing switch MMSDRX from pulses extended via contacts 348. Thus the EOM of a message in the process of being recorded, while other portions of the tape record are being transmitted results in the interruption of such transmission to permit the use of transmitter 380 for recording the EOM. Relay 110 remains operated by pulses from contacts 396. Switch MMSDRX is stepped as described to permit recording the EOM and then transfers the transmitter numbering pulse contacts 386 over contacts 262 to the character counting switches indicated by box MMT″X. Switch MMSDRX remains in position while a number of characters corresponding to markings placed on the particular position of switch MMSDRX are transmitted to reperforator 390 and the characters are counted by switch MM″UX and MM″TX as explained in the aforementioned application. After the required number of characters are counted, the circuit for clutch magnet 385 is opened at contacts (not shown) and relay 250 is operated by a relay (not shown) under control of switch MMSDRX as explained in the aforementioned application. Relay 250 locks operated over contacts 257′ to ground at contacts 223, 216 and 179 and energizes its upper winding over contacts 258 under control of switch MMSDRX. Relay 250 restores relays 170, 210 and 230 at contacts 156 to restore respective holding circuits for itself at contacts 179 and 216. It also homes switches MMU″X and MMT″X at contacts 253 and 257 respectively to restore respective holding circuits for itself.

Relay 170 now opens the circuit to relay 220 at contacts 176′. With relays 220 and 170 restored, a circuit is completed from contacts 171, 142, 222 and 243 to relay 340, but a shunt ground from switch MMSDRX extended thereto in any well-known manner prevents its operation. Relay 230 on restoring, completes a self-interrupted stepping circuit to MMSDRX at contacts 234 and the switch removes the holding ground for the upper winding of relay 250 to allow it to restore and the shunting ground from relay 340 to allow its operation. Switch MMSDRX also restores the relay, which completed the original operating circuit from relay 250. Relay 250 restores, when all holding grounds therefore are removed.

Relay 340 then operates to recomplete the circuit to clutch magnet 385 over contacts 146′, 178′, 336, 371, 377 and 345. At this time relays 130, 140, 160 and 340 are operated and the transmitter 380 reoperates the tape reader 370 and relay 110, as explained.

A transmission path is again completed between the monitor transmitter 380 and the monitor tape reader 370 under control of relay 340 as before explained. Transmission to radio station now proceeds as previously described. The monitor tape reader 370 continues to read all the slack tape pulled back by the operator plus additional message characters received from the cross office unit, which appear on the tape advanced by the reperforator in responding to added characters and all are transmitted via transmitter 380 and polar relay 360 to the radio station 300 and the desired destination.

As the message tape becomes tight between the monitor tape reader and the monitor reperforator, slack tape contacts 377 open to deenergize the transmitter clutch magnet 385 by disconnecting the ground from magnet 385. Tight tape contacts 378 now close to extend the ground at contacts 371, past contacts 147′, 239′, and 259′ to energize the lower winding of relay 260. The transmitter on terminating operation stops operation of tape reader 370 and allows relay 110 to restore.

Operated relay 260 locks operated over contacts 267 and 167′. At contacts 264 it connects the lower winding of relay 250 to switch MMT″X and at contacts 262 disconnects the character counting switches MMT″X from switch MMSDRX. At contacts 265 it prepares a holding circuit for relay 250. It connects the reperforator pulsing contacts 396 to switches MMU″X and MMT″X at contacts 263 to step that switch in response to each reperforator cycle. At contacts 262 it disconnects the character counting switches for switch MMSDRX. At contacts 261 it extends ground from contacts 251 to the bias winding of the monitor reperforator magnet 395, which now feeds out blank tape.

During each blank tape feed out cycle, the reperforator pulses switch MMU″X over contacts 396 and 263 to advance the same whereby switches MMU″X and MMT″X count the number of blanks. As the tape becomes slack, the contacts 378 open and contacts 377 close to energize the transmitter clutch magnet 385. This allows the transmitter 380 to operate. It in turn operates relay 110 and the tape reader magnet 310 whereby the message characters are transmitted to polar relay 360 and the radio station, as explained.

The reperforator feeds out the blank tape, until switch MMT″X receives a predetermined number of pulses from contacts 396 indicating that it has fed out the required amount of tape. Switch MMT″X then extends ground over contacts 264 to energize the lower winding of relay 250. As the amount of tape fed out is enough to ensure that the slack tape contacts 377 are closed until at least the message EOM has been transmitted, the message is transmitted in its entirety, when relay 250 operates.

Operated relay 250 opens the reperforator bias winding circuit at contacts 251 to stop the blank tape feed-out. At contacts 259 it locks operated over contacts 166 and 265. At contacts 253 and 257 it completes a homing circuit for switches MMU″X and MMT″X, which open the original circuit for relay 250. Relay 250 now however is locked operated over contacts 259, 166 and 265. When the tape becomes tight contacts 377 open to terminate operation of the transmitter 380 and in turn tape reader 370. Transmission is then terminated.

After the message is thus transmitted, an operator removes the tape from the tape reader 370 and opens key contacts 302 and reader start contacts 371. Relay 160 restores on opening of contacts 302 to open the circuits to relays 130 and 140 respectively at contacts 162 so that both relays 130 and 140 restore. At contacts 166 relay 160 opens the holding circuit to relay 250, and at contacts 167′ opens the circuit to relay 260. Both relays 250 and 260 then restore. The channel unit is now accessible to a waiting cross office unit as relay 130 is restored to close contacts 132 and 134.

*Message re-run*

On occasion re-runs of messages sent to a particular outgoing channel are requested by a particular station. Such messages must be transmitted to a reperforator at a patch table, where a new message heading including a new message number can be provided. To enable an operator to transmit a message from the monitor reperforator reel on which it is stored at the outgoing channel unit from which it was sent, without cutting the tape, a re-run arrangement utilizing tape reader 370 is provided.

When a request to re-run a message is received at the switching center, an operator selects the message from the particular outgoing channel unit monitor reperforator reel by unwinding tape 389 from reel 398 at the outgoing channel unit from which the message was sent. She then punches a hole in the tape at the end of the message and in alignment with contacts 304 in any well known manner. Retransmission key 105 is then operated to energize relay 320 over contacts 161.

Relay 320 disconnects key contacts 302 from relay 160 at contacts 321 to prevent mistaken operation of contacts 302 from operating relay 160. At contacts 322 it prepares a holding circuit for itself. At contacts 323 and 324 it disconnects ground from the lead marking the channel unit 7000X on level A of switches MM—MM4 and connects battery through relay 330 to mark the unit on the corresponding bank contact of each re-run selector switch such as MM having access to the unit. Switch such as MM has access to, for example, twenty-five channel units including channel unit 7000X for the purpose of extending signal paths therefrom to a markable transmitter such as 401 individual to one switch in each group of four switches. At contacts 325 relay 320 extends resistance ground to light the signal lamp 399, and at contacts 326 extends ground from contacts 339′ to energize the re-run assigner start relay 410 individual to the four switches having access to channel unit 7000X.

Relay 410, on operating, closes contacts 411 to complete a circuit to relay 580 over contacts such as 541 and/or 561 depending on which one or ones of the four markable transmitter switches MMG1–MMG4 are idle. At contacts 412 relay 410 prepares a circuit to relays such as 430 and 460 individual to each re-run selector switch such as MM and MM4 respectively having access to the group of channel units associated with channel unit 7000X.

Relay 580, on operating, closes contacts 581 to extend ground over the normal contact of level A of assigner switch MMA and through the self-interrupting contacts of the switch motor magnet to energize the motor magnet. At contacts 582 relay 580 extends ground to the wiper of level B of switch MMA. The motor magnet now steps the switch self-interruptedly to its first contact.

On its first contact, the switch MMA wiper is associated with the first re-run patch table transmitter switch individual to transmitter 401 for example. If the transmitter 401 associated with switch MMG1 is busy, relay 540 is operated to extend ground from contacts 542 to the first contact of level A of switch MMA so that the switch motor magnet is again energized. It then steps in a self-interrupted manner to the succeeding contact, where the procedure may be repeated. If switch MMA fails to find an idle patch table transmitter switch, it steps self-interruptedly to its home position where it again encounters ground at contacts 581. It therefore continues to search for an idle switch such as MMG1 until it finds one.

Assuming that the transmitter 401 is idle and therefore relay 540 associated with switch MMG1 is unoperated, then the level A wiper of switch MMA forwards no ground to its motor magnet, when it steps to its first contact as the contacts 542 are open. The switch therefore steps no further, while ground from contacts 582 is extended over contacts 543 to energize relay 510 individual to switch MMG1 to thereby select for example, the first patch table transmitter switch MMG1.

Relay 510 closes contacts 511 to forward the ground from contacts 412 to the start relay 430 of the re-run selector switch MM1. It also closes other contacts such as 511c to prepare respective circuits to a relay such as 430 individual to one switch such as MM1 having access to transmitter 401 in each other group of four re-run selector switches, which groups each have access to a different group of twenty-five channel units. The respective circuits to the relays corresponding to 430 and associated with other re-run selector switches are not completed, unless the relay corresponding to 410 associated with the group is operated to prepare the respective circuit at contacts corresponding to 412. At contacts 512 a self-interrupted stepping circuit for switch MMG1 is prepared by relay 510.

Relay 430 and any other corresponding relay of each re-run selector switch having access to the different groups of twenty-five channel units and access to transmitter 401, on operating, close such as contacts 431 to extend a self-interrupting circuit for the motor magnet of the corresponding switch. For switch MM1 the circuit extends over contacts 421 and the level A wiper associated with the bank contact of a channel unit extending ground from contacts such as 323 or if the switch is in its normal position the circuit includes ground on the normal contact of level A and contacts 421 and 431. The motor magnet is energized and switch MM1 is stepped in a self-interrupted manner in search of the channel unit 7000X having battery from relay 330 marking its bank contact. At contacts 432 relay 430 prepares a circuit for the lower winding of relay 420.

When wiper A of switch MM1 finds battery over contacts 324 through relay 330, the battery is extended through the lower winding of relay 420 to ground through contacts 432, while the motor magnet of switch MM1 is shunted by the battery on the level A wiper. One or more other switches corresponding to MM1 and having access to other channel units may, if operated, similarly find battery from a channel unit to which each has access at contacts corresponding to 324 for energizing a relay corresponding to 420 at the switch. Relay 420 energizes to open the circuit to the motor magnet of switch MM1 at contacts 421, and closes a circuit for relay 530 over contacts 425 and 446. At contacts 422 relay 420 prepares a circuit to its upper winding. At contacts 423 relay 420 marks the contact corresponding to selector switch MM on the bank contacts of switch MMG1 with battery, while removing the ground marking thereon at contacts 424.

Relay 530, on operating, completes a self-interrupted stepping circuit for the motor magnet of switch MMG1 over contacts 531, 512 and 551, over the level A wiper of switch MMG1 to ground at contacts such as 424, if the wiper of switch MMG1 is associated with a contact corresponding to a selector switch, which has not extended a battery marking thereto. Likewise at contacts such as 532 relay 530 prepares a stepping circuit for each of the other transmitter switches such as MMG4. The motor magnet of switch MMG1 steps the switch self-interruptedly in search of the battery marking through relay 440. On finding the battery marking from relay 440, it is extended through the lower winding of relay 550 to energize that winding.

The lower winding of relay 550, on energizing, opens the circuit to the motor magnet of switch MMG1 at contacts 551 and at contacts 553 energizes relay 540. At contacts 552 it completes an energizing circuit to its low resistance upper winding over the level A wiper of switch MMG1. Relay 440 energizes in series with the low resistance upper winding of relay 550 and opens the circuit to relay 530 at contacts 446. Relay 540 opens contacts 541 to open one of the energizing circuits for relay 580, and at contacts 543 opens the circuit to relay 510. Relay 510 opens the circuit to relay 430 at contacts 511.

If each of the four switches MMG1–MMG4 are in use, each of the contacts corresponding to 541 and 561 are open and relay 580 restores to open contacts 581. In this case, each of the contacts such as 542 and 562 are closed to extend ground to the corresponding bank contacts of switch MMA, and it terminates operation on reaching its home position.

If a succeeding one of the switches such as MMG4 is idle, switch MMA steps to the corresponding position, where it extends ground from contacts 582 to operate relay 520 individual to switch MMG4, if relay 580 has not restored at the time switch MMA is stepped to the corresponding position. Relay 410 generally will be released to restore relay 580, before relay 520 can operate as will be explained. Relay 520, if operated, closes contacts such as 521 and 521C to prepare a circuit to a relay such as 460 associated with the fourth re-run selector switch in each group. If relay 410 is still operated relay 460 is operated over contacts 521, as explained for relay 430. Relay 460 now controls the stepping of switch MM4 in search of channel unit such as 7000X which has marked its bank contact with battery. At that time relay 450 is operated as explained for relay 420, and it reoperates relay 530. Relay 530 completes at contacts 522 a self-interrupted stepping circuit for switch MMG4, at contacts such as 455, which now steps in search of a battery marking over contacts 454 and relay 470. On finding switch MM4, relays 570 and 470 are operated as explained for relays 440 and 550 respectively.

Returning now to relay 440, on energizing, it closes contacts 441 to complete a circuit through the low resistance upper winding of relay 420, over contacts 422, the level A wiper of switch MM1 to battery through relay 330. Relay 330 energizes in this circuit. At contacts 442—443 relay 440 connects the wipers of levels B—F to the markable transmitter 401 individual to switch MMG1 and at contacts 444 and 445 connects the wipers of levels G and H respectively to the transmitter 401.

Relay 330, on operating, closes the contacts 331, 332—333, 335, 337, 338 and 339. Contacts 331 on closing complete a holding circuit for relays 320 over contacts 322 and 304. Contacts 332—333 extend the signal leads from the tape reader to the respective levels of B—F of switch MM1 over leads R1—R5 which extends them to the selected transmitter 401. At contacts 335 direct ground is extended past contacts 371, 377 and 337 to the level G wiper of switch MM1 and contacts 444 to energize the clutch magnet of transmitter 401. At contacts 339 direct ground is extended to lamp 399 and it lights brightly to signal the attendant that the transmitter is connected. At contacts 339′ the circuit to relay 410 is restored, unless another channel unit is extending ground to relay 410 over contacts corresponding to 326 and 339′. In this case switch MMA steps to control another re-run selector switch such as MM4 to find the channel unit, as explained and the relay corresponding to 330 thereat is operated, as explained, to extend the respective tape reader signal leads through respective levels of switch MM4, for example, and respective contacts of relay 470 to the associated transmitter. If relay 410 is restored on operation of relay 330 it opens the circuit to relay 580 at contacts 411, unless a relay corresponding to 410 associated with another group of re-run selectors is extending a circuit thereto. Relay 410, if restored, prevents the completion of a circuit to a relay such as 460 and therefore in this case a re-run selector switch such as MM4 having access to the same group of channel units is not operated.

With the clutch magnet of the transmitter 401 energized, the transmitter now goes through one cycle and extends ground from its numbering contacts back over contacts 445, the level H wiper and 338 contacts to energize magnet 310. When the transmitter opens its numbering pulse contacts, relay 310 is deenergized to advance the tape and permit the tape reader to sense the succeeding character. During the next transmitter cycle magnet 310 is again energized and the procedure for advancing and reading the tape is repeated. In this fashion the message is read and signals corresponding thereto are transmitted from the tape reader sensing contacts, through contacts 332—333, leads R1—R5, via levels B—F of switch MM and contacts 442—443 respectively, through the sequentially operated contacts of transmitter 401 to reperforator 402. It will be noted that the transmission of the message recorded at the outgoing channel unit to a patch table in no way interferes with normal transmission from a message through the channel unit, which proceeds as described previously in the section entitled Normal channel unit operation.

The reperforator 402 perforates a tape in accordance with the message and the attendant at the patch table adds a new message heading thereto, as a new message number must be assigned to the message before it can again be routed. The new message tape is then forwarded to the desired destination from a manual forwarding position as explained in the aforementioned application.

In the meantime relay 410 on restoring opens contacts 411 and 412. Opening contacts 411 restores relay 580, unless it were already restored through the opening of contacts such as 541 and 561 of each of the switches corresponding to MMG1 and MMG4 respectively. Relay 580 will remain operated in the event a relay corresponding to 410 and associated with another group of re-run selector switches has operated contacts corresponding to 411 and one or more of the switches corresponding to MMG1 and MMG4 are idle over a circuit similar to that described. In this case an idle one of the switches such as MMG4 is used to control the selection of a re-run selector having access to the group of channel units operating the relay corresponding to 410 in a manner explained. Opening contacts 412 restores relay 430, and, if operated, the corresponding relays such as 460 associated with the other selector switches such as MM4 having access to the same groups of channel units. Relay 430 on restoring opens contacts 432 to deenergize the lower winding of relay 420, which remains operated over its upper winding.

The attendant on noticing lamp 399 brightly lighted opens the transmission key contacts 105. This opens the original circuit to relay 320 which remains operated over its holding circuit including contacts 322, 331 and 304. When the message has been completely transmitted to reperforate 402 at the patch panel the hole in the tape at the end of the message permits contacts 304 to open and restore relay 320. Relay 320 restores the original marking to switch MM at contacts 323 and at contacts 324 opens the circuit to relay 330.

Relay 330 restores to disconnect the tape reader from leads R1—R5 and the markable transmitter 401 at contacts 332—333. At contacts 335 and 337 it opens a circuit to the clutch magnet of transmitter 401. At contacts 338 it opens the circuit to the tape reader stepping magnet 10, which receives no further pulses from the markable transmitter 401. Relay 330 also closes the contacts 339', however contacts 326 being open at this time prevent ground from being forwarded to relay 410. With both contacts 325 and 339 open the lamp 399 is extinguished to signal the attendant and she restores the tape reader start contacts 371. Another message may now be re-run to the patch panel from the channel unit 7000X.

Thus having described my invention, I am appending hereto a series of claims which I believe encompass the inventive concept of my invention.

I claim:

1. For use in a telegraph switching center having a plurality of outgoing channel units each having access to destinations for transmitting respective messages thereto, a cross office unit common to said channel units and connected therewith at respective times for transmitting telegraph messages thereto, a reperforator at each channel unit for recording each message transmitted to its respective channel unit from said cross office unit, repeating means at each outgoing channel unit for repeating message signals to the respective destinations, a transmitter at each channel unit, a tape reader at each channel unit, means for marking the transmitter at each channel unit in accordance with certain predetermined message signals, means for controlling said repeating means and said recording means for respectively transmitting and recording message signals from both said cross office unit and the transmitter at the channel unit with which said cross office unit is associated, and operating means operated during the transmission of message signals from said cross office unit for controlling said tape reader to mark the transmitter at one channel unit in accordance with recorded predetermined message signals and recorded message signals transmitted from said cross office unit and recorded by said tape reperforator.

2. In an arrangement such as claimed in claim 1, a plurality of transmitters common to said channel units each having a reperforator individual thereto, means operated for selecting one of said transmitters and associating said selected transmitter with a particular channel unit, and means thereafter effective for controlling said tape reader to mark said selected transmitter in accordance with recorded signals at said channel unit whereby said signals are recorded by the reperforator individual to said selected transmitter.

3. For use in a telegraph switching center having a plurality of outgoing channel units having access to respective destinations for transmitting respective messages thereto, a cross office unit common to said channel units and connected therewith at respective times for transmitting respective telegraph messages thereto, a reperforator at each channel unit for recording each message transmitted to its respective channel unit from said cross office unit, repeating means at each outgoing channel unit for repeating message signals to the respective destinations, a transmitter at each channel unit, a tape reader at each channel unit, means for marking the transmitter at each channel unit in accordance with certain predetermined message signals, means for controlling said repeating means and said reperforator for respectively transmitting and recording message signals from both said cross office unit and the transmitter at the channel unit with which said cross office unit is associated and operating means operated for controlling said tape reader to mark the transmitter at one channel unit in accordance with recorded message signals recorded on said reperforator.

4. For use in a telegraph switching center having a radio station remote therefrom, a plurality of outgoing channel units having access to respective destinations for transmitting respective messages thereto, one of said channel units having a communication path to said radio station for transmission of its messages over a radio circuit, a cross office unit common to said channel units and connected therewith at respective times for transmitting respective telegraph messages thereto, a tape reperforator at each channel unit for recording on a tape each message transmitted to its respective channel unit from said cross office unit, repeating means at each outgoing channel unit for repeating message signals to the respective destinations, a transmitter at each channel unit, a tape reader at each channel unit, means for marking the transmitter at each channel unit in accordance with certain predetermined message signals, means for controlling said repeating means and said reperforator for respectively transmitting and recording message signals from both said cross office unit and the transmitter at the channel unit with which said cross office unit is connected, means operated at said radio station operated by the attendant thereat for controlling said tape reader to mark the transmitter at said one channel unit in accordance with recorded message signals recorded on said reperforator, and for operating said repeating means accordingly, a plurality of transmitters common to each of said channel units, means operated for selecting one of said transmitters and connecting said selected transmitter with a particular channel unit, and means thereafter operated for controlling said tape reader to mark said selected transmitter in accordance with message signals recorded on said reperforator.

5. For use in a telegraph switching center having remote therefrom a radio station, a plurality of outgoing channel units to which respective messages are transmitted to respective destinations, one of said channel units having a communication path to said radio station for transmission of its messages over a radio circuit, a cross office unit common to said channel units for transmitting respective messages thereto, a reperforator at each channel unit for recording on a tape each message transmitted to its respective channel unit from said cross office unit, a transmitter at each channel unit, a tape reader at each channel unit, repeating means at each outgoing channel unit for repeating message signals to respective destinations, means controlled from said radio station for controlling said tape reader at one channel unit to mark the transmitter at said one channel unit in accordance with recorded message signals recorded on said tape whereby the repeating means at said channel unit is controlled to repeat said recorded signals to said radio station, a plurality of transmitters common to said channel units, a switch individual to each of said common transmitters, a group of switches having access to different ones of said channel units and accessible to respective ones of said transmitter switches, a last switch for selecting one of said transmitter switches, means at a particular channel unit for operating said last switch to select one of said transmitter switches and for operating one switch of said group of switches to find said particular channel unit, means operated by said selected transmitter switch for selecting said one switch whereby the tape reader at said particular channel unit is connected through said one switch to the common transmitter individual to said selected transmitter switch, and means for thereafter controlling said tape reader to mark said common transmitter over said connection in accordance with recorded message signals at said particular channel unit.

6. A telegraph switching system including a plurality of cross office units and a plurality of outgoing channel units, with a transmitter in each channel unit controlled from a cross office unit to transmit messages received from the cross office unit via radio to distant stations, a tape reperforator associated with each transmitter operated to record on a tape the messages transmitted by said transmitter, a radio station via which said messages are transmitted, a tape reader associated with said reperforator, signals at the channel unit, means at the radio station for operating said signals to signal the attendant at the channel unit that a message should be repeated, said attendant having means for withdrawing a certain portion of the tape from the storage spool of the reperforator and placing it in the tape reader so that it will be drawn through the reader to the storage spool and means for then causing a previously transmitted message, recorded on the tape, to be retransmitted by means of the tape reader and the transmitter, to the radio station.

References Cited in the file of this patent

UNITED STATES PATENTS

| | | |
|---|---|---|
| 2,706,215 | Van Duuren | Apr. 12, 1955 |
| 2,805,283 | Stiles | Sept. 3, 1957 |